(12) United States Patent
Shukla et al.

(10) Patent No.: US 11,037,432 B1
(45) Date of Patent: Jun. 15, 2021

(54) INTELLIGENT SECURITY SYSTEM

(71) Applicant: Amazon Technologies, Inc., Seattle, WA (US)

(72) Inventors: Ashish Kumar Shukla, Milpitas, CA (US); Sakthi Kannan Ramabadran, Sunnyvale, CA (US); Xi Chen, San Jose, CA (US); Armando J. Lucrecio, Milpitas, CA (US); Avinash Joshi, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/714,321

(22) Filed: Dec. 13, 2019

(51) Int. Cl.
*G08B 25/00* (2006.01)
*G08B 25/14* (2006.01)
*G06F 16/335* (2019.01)
*G06N 20/00* (2019.01)

(52) U.S. Cl.
CPC ......... *G08B 25/001* (2013.01); *G06F 16/337* (2019.01); *G06N 20/00* (2019.01); *G08B 25/008* (2013.01); *G08B 25/14* (2013.01)

(58) Field of Classification Search
CPC .... G08B 25/001; G08B 25/14; G08B 25/008; G06F 16/337; G06N 20/00
See application file for complete search history.

(56) References Cited

U.S. PATENT DOCUMENTS

| 2014/0266684 | A1* | 9/2014 | Poder | G08B 25/001 340/521 |
| 2018/0293367 | A1* | 10/2018 | Urman | G06K 9/00335 |

\* cited by examiner

*Primary Examiner* — Thomas S McCormack
(74) *Attorney, Agent, or Firm* — K&L Gates LLP

(57) ABSTRACT

Systems and methods of security monitoring using a learning process are provided. Intelligent security systems may perform a learning process to observe the paths of travel by occupants, as detected by various sensors distributed throughout a monitored location over a period of time. After the security system is initially installed, the system may learn the various paths taken by occupants of the house by keeping track of the sequence in which the sensors are activated due to normal human activity. Based on this data, a fully connected graph of sensors with all valid interconnections between sensors is available to the security system.

16 Claims, 7 Drawing Sheets

INTELLIGENT SECURITY SYSTEM

BACKGROUND

Security systems often include multiple sensors for detecting motion within or around a facility, such as a home or business. These systems may operate in different modes: disarmed, home, and armed. In the disarmed mode, the security system does not monitor any of the sensors, so no security monitoring is provided. In the armed mode, the security system monitors all of the sensors, and movement detected by any of the sensors may trigger the alarm. The home mode is typically used when there are occupants in the facility, so the sensors outside the building are monitored, with any detected movement triggering the alarm, but the sensors inside the building are not monitored. This allows the occupants to move about inside the facility without triggering the alarm, but also limits the effectiveness of the security system, as the interior sensors are no longer effective at detecting unauthorized intrusion.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In accordance with embodiments of the present invention, systems and methods of security monitoring using a learning process are provided. Intelligent security systems may perform a learning process to observe the paths of travel by occupants, as detected by various sensors distributed throughout a monitored location over a period of time. After the security system is initially installed, the system may learn the various paths taken by occupants of the house by keeping track of the sequence in which the sensors are activated due to normal human activity. Based on this data, a connected graph of sensors with all valid interconnections between sensors is available to the security system.

After the security system is installed, the learning phase begins. At this stage, the security system may not have any information regarding the locations and relative positions of the sensors throughout the house, and, in fact, may not have any information regarding the layout of the house itself. As the household members walk through the house, via every possible pathway, doorway, and route, the system can acquire information regarding the possible valid or known paths occupants may take through the house. As occupants move throughout the house, the occupants will be detected by those sensors (each sensor having a unique device identifier), and the sequence of detections may be stored as valid or known paths. After the learning phase, the security system may be operated in "home mode," in which the interior of the house will be monitored, even while authorized occupants move about within the house. When the occupants move along the known paths stored in the valid or known path database, the security system remains in a stand-by state. When an occupant is detected travelling along an unknown path, the system transitions to an alarm state.

Figure 1:
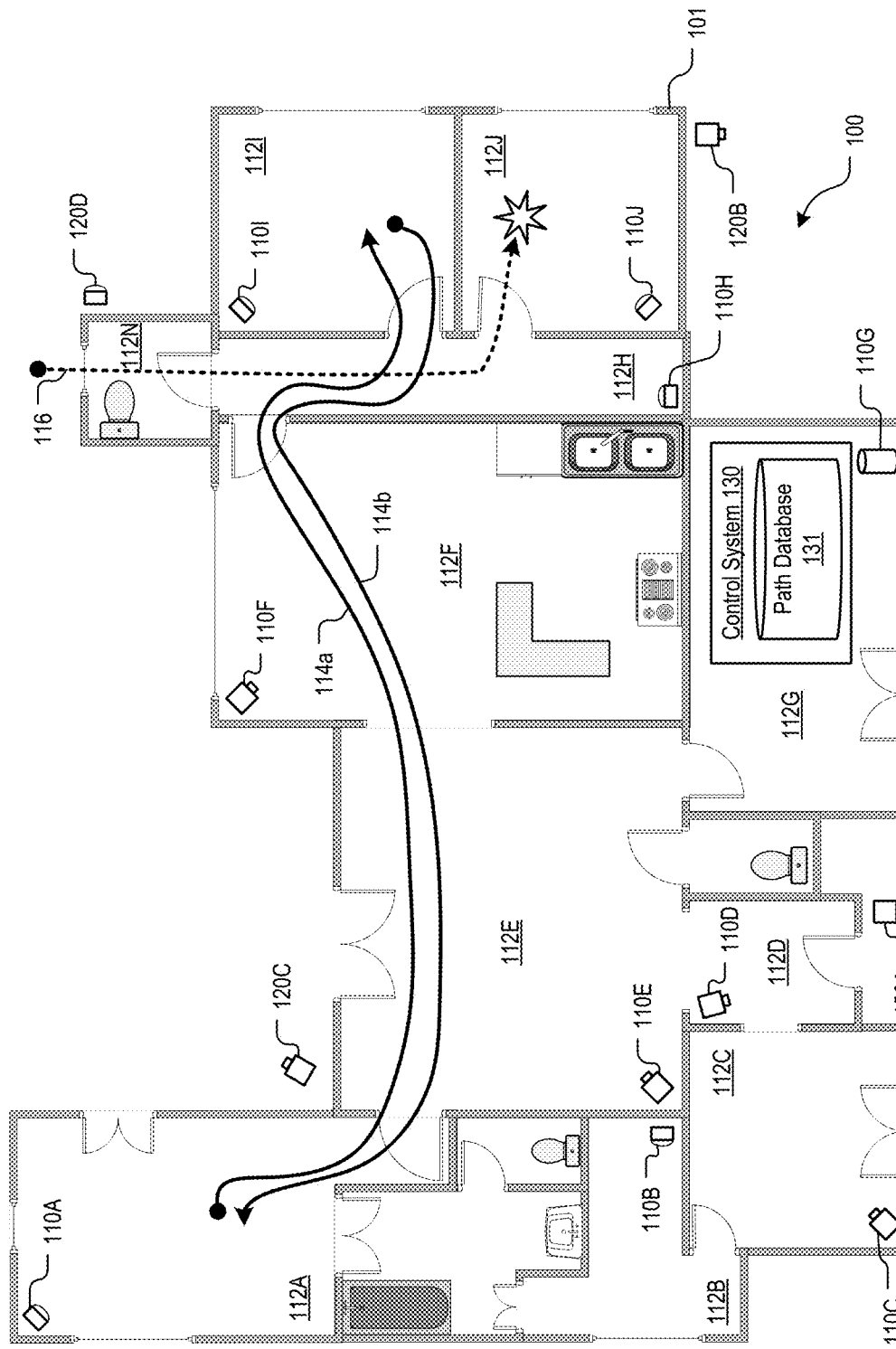
FIG. 1 is an illustrative depiction of a security system installed in a single family residence, in accordance with embodiments of the present invention.

FIG. 1 is an illustrative depiction of a security system, in accordance with embodiments of the present invention. FIG. 1 depicts a security system 100 installed in a single-family residence building 101. The security system 100 includes a plurality of interior sensors 110A-110J, distributed throughout the interior of building 101 and a plurality of exterior sensors 120A-120D distributed around the exterior of the building 101. These sensors 110A-110J, 120A-120D are communicatively coupled to an alarm control system 130 via a network, e.g., a wireless local area network (WLAN 650, shown in FIG. 6).

Any suitable type, number, and combination of sensors may be used in accordance with various embodiments. In the illustrated embodiment, the security system 100 includes a variety of different sensors, such as sensors 110C-110F and 120A-120D comprising imaging devices, sensors 110A-110B and 110H-110J comprising motion sensors, and sensor 110G comprising a speech processing-enabled device. The imaging device sensors 110C-110F and 120A-120D include image sensors and associated optics for capturing images and/or video. The motion sensors 110A-110B and 110H-110J may comprise, e.g., a microwave sensor, an ultrasonic motion sensor, a passive infrared (PIR) sensor, which detects motion by determining differential changes in the infrared (IR) radiation emitted by objects within the PIR sensors' fields-of-view, or any other suitable device for detecting motion. The speech processing-enabled device sensor 110G in room 112G may not include an image sensor or motion detector, but instead can use a microphone to detect the presence of occupants by detecting audio indicative of movement (e.g., footsteps, rustling of clothing, speech, etc.). In other embodiments, the sensors may comprise heat sensors for detecting body heat. These heat sensors could be used to detect the presence of occupants in a room, even if those occupants are sleeping or otherwise motionless. In yet other embodiments, image sensors may be used in conjunction with computer vision software (executing on the sensor itself or on another computing device) capable of identifying human forms and/or identifying known individuals. In yet other embodiments, the sensors may comprise wireless RF signal location tracking systems capable of tracking devices emitting RF signals. This can be used to identify the location of individuals carrying mobile devices with wireless communication interfaces, such as Wi-Fi or Bluetooth radios.

Each of the sensors 110A-110J, 120A-120D may comprise one or more processors, a memory for storing instructions for execution by the processors, a battery (if battery-powered), the motion sensor components (e.g., image sensor or PIR sensor), and a radio for wireless communications. Each of the sensors 110A-110J, 120A-120D has a sensor coverage area (e.g., a field-of-view of the motion sensor or imaging device image sensor) that may include all or a portion of the room in which the sensor is positioned.

In the illustrated embodiment, the control system 130 is located within the same building as the sensors 110A-110J, 120A-120D, and communicates with the sensors 110A-110J, 120A-120D over a WLAN 650. In other embodiments, the control system 130 may be remotely located from the sensors 110A-110J, 120A-120D and the building being monitored, and may communicate with the sensors 110A-110J, 120A-120D over a wide area network (WAN) such as the Internet.

The security system 100 can be set by the user to different modes, depending on the level of security desired. In the away or armed mode, the control system 130 monitors all sensors 110A-110J, 120A-120D. In the disarmed mode, the security system 130 does not monitor any of the sensors, so no security monitoring is provided. The sensors may be powered off entirely or the control system 130 may simply not monitor any incoming signals from the sensors regarding detected motion. The home mode of the security system 130 may have two phases: learning phase and active phase. During the home mode, the security system 130 may continue to monitor exterior sensors 120A-120D in the same way in which they are monitored during armed mode, such that motion detected in the areas outside the building 101 will cause the system to transition to an alarm state. However, during the learning phase of the home mode, the system 130 monitors and records all of the movement detected by the interior sensors 110A-110J, but any movement or occupant presence detected by the sensors 110A-110J will not result in a change to an alarm state, and instead may be recorded as a detection event by the system 130. As the occupants move throughout the building 101, their presence in different rooms will be detected by the sensors in those rooms. The order in which the sensors 110A-110J detect these events is recorded as a known or valid path of occupant travel in a known path database 131 of the control system 130.

FIG. 1 depicts two known paths 114a-114b that may be taken by an occupant of the building 101 and recorded by the security system 130 during the learning phase. Path 114a begins with a person (e.g., a father) in the master bedroom 112A, where the motion sensor 110A detects his movement through the coverage area of sensor 110A. He exits the master bedroom 112A and enters the living room 112E, where his movement through the living room 112E is detected by the imaging device in sensor 110E. He then travels through the family room 112F, where his movement is detected by the imaging device in sensor 110F, to the hallways 112H, where his movement is detected by motion sensor 110H. Finally, he enters a child's bedroom 112I, where his presence is detected by motion sensor 110L Each of these sensors 110A, 110E, 110F, 110H, and 110I report the detection of an event to the control system 130, which records the sequential detection of the father's movement along path 114a by sensors 110A, 110E, 110F, 110H, and 110I (or, in shortened notation, A-E-F-H-I). This path 114a comprising steps A-E-F-H-I is stored as a known path in a known path database 131 of the control system 130. When the father returns to his bedroom along return path 114b, his movement is detected in reverse order by sensors 110I, 110H, 110F, 110E, and 110A (or, in shortened notation, I-H-F-E-A), and this movement through steps I-H-F-E-A is stored as another known path in the known path database 131. Alternatively, the paths 114a-114b may be stored as a single known path A-E-F-H-I-H-F-E-A. Similarly, other movements and travel paths of the various occupants in the building 101 detected by the sensors 110A-110J during the learning phase are stored as additional known paths in the known path database 131. These stored known paths may form a "whitelist" of approved patterns of motion detection, so that subsequent detection of any of those whitelisted patterns of motion detection will be ignored and not result in a transition to an alarm state.

After the learning phase is completed, the active phase of the home mode may begin. In the active phase, the system 100 monitors the interior sensors 110A-110J for movement, even though there are people moving about the building 101. When movement is detected along a previously-identified known path, the system does not transition to an alarm state. For example, after a family returns home, the mother may change the mode of the security system 100 from the armed mode (during which time movement detected by any of the sensors 110A-110J, 120A-120D will cause the system to transition to an alarm state) to the home mode. While in active phase of the home mode, the sequential detection of movement or presence of occupants in the coverage areas of the various interior sensors 110A-110J is monitored. Each time an occupant is detected by a sensor 110A-110J, the control system 130 checks the data in the known path database 131 to confirm that movement of the occupant through the building 101 corresponds to one of the stored known paths. For example, at bedtime, the mother may walk from the master bedroom 112A to the child's bedroom 112I along the path 114a. Her movement through the coverage areas of the sensors 110A, 110E, 110F, 110H, and 110I is monitored and the control system 130 confirms that the path of travel corresponds to a known valid path, so the system remains in a stand-by state.

During the active phase of home mode, if an occupant of the building 101 is detected as travelling along a path that is not stored as a known path, the system may transition to an alarm state. For example, if a burglar enters through a window in the bathroom 112N and travels along path 116, the burglar will first be detected in the hallway 112H by motion sensor 110H, and then be detected in the second bedroom 112J by the motion sensor 110J. Since none of the authorized occupants of the building 101 would have entered the building 101 through the bathroom window during the learning phase, this path 116 from sensor 110H to sensor 110J (or, in shortened notation, H-J) would not be stored as a known path in the known path database 131. Accordingly, when this H-J movement is detected, the system transitions to the alarm state.

The change in alarm state can result in a variety of outcomes, in accordance with various embodiments. In some cases, it may be desirable to request confirmation from a user that the detected path is invalid. It may be possible that the path being taken by the occupant is valid but very rarely used, and therefore might not have been observed during the learning phase. In this case, it may be desirable to utilize one or more intermediate warning steps before activating an audible alarm siren and/or contacting the police or security service. For example, the control system 130 may send a message to the homeowner's mobile phone causing the mobile phone to display a user interface element indicating that the system has initiated an alarm state and asking for confirmation that the system should proceed with subsequent alarm operations, such as activating the siren and/or contacting the police or security service. If the homeowner responds by providing an input using the user interface element to terminate the alarm state and accept the detected path, the system 100 can return to a stand-by state and continue the home mode monitoring. In some embodiments, the message may include a description of the detected movement, such as the path taken and/or images captured by one or more sensors. The message can be sent in any suitable manner, such as by text message, telephone call, or communication to a security system application on the homeowner's mobile device. In other embodiments, the security system 100 may include a dedicated display with a user input device (e.g., a keyboard, keypad, or touchscreen) for communicating with the user, or may utilize another computing device in the building 101, such as a television, smart device, etc.

In accordance with some embodiments, the system 100 may continue to supplement or modify the known path database 131 to add new known paths or to delete or modify previously-stored known paths, even after the learning phase has been completed. In the example above, the system may transition to an alarm state upon detection of movement along an unknown or invalid path, but the user, in response to a notification message, may notify the system that the detected path is a valid one. In this case, the system 100 may add that path to the known path database 131 as a new known path. In other examples, if the system does not detect occupant travel along a previously-stored known path within a certain predetermined period of time (e.g., 1 year, 2 years, etc.), that path may be deleted from the known path database 131. This may be desirable in a variety of situations, such as if a user moves one of the sensors to a different location. This could render the previously-stored known paths through that sensor's coverage area obsolete and incorrect. Accordingly, it may be desirable for the stored known paths to be deleted after a predetermined period of time, or if the user informs the system that one of the sensors has been moved. In some embodiments, the retention of a previously-stored known path may be a function of the frequency or number of times movement along that known path has been detected. For example, a first known path that had been detected a small number of times (e.g., just one time) may be deleted from the known path database 131 if not detected again for a first predetermined period of time (e.g., 1 year), but a second known path that had been detected many times (e.g., ten or more times) may remain in the known path database 131 even if not detected again for the first predetermined period of time. Instead, that second known path may only be deleted from the known path database 131 after a second predetermined period of time longer than the first (e.g., 2 years). In some embodiments, the second predetermined period of time may be a function of the number of times movement along the second known path had been detected (e.g., an additional 1 year for every 5 additional detections).

Figure 2A:
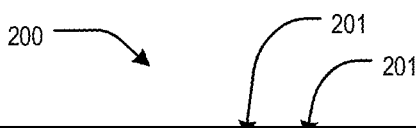
FIG. 2A depicts a known path database for a security system, in accordance with embodiments of the present invention.

The known path database 131 may store information regarding the detected known paths in any suitable way. FIG. 2A depicts a portion of known path database 200, in accordance with embodiments of the present invention. In the known path database 200, each row corresponds to one of the known valid paths previously identified during the learning phase. Each known path includes a series of motion sensor identifiers 201, with each identifier corresponding to one of the sensors in the security system. In the illustrated example, simplified identifiers (e.g., 110A, 110E, etc.) are used for each sensor, but in other embodiments, any form of unique identifier for each sensor may be used. In some embodiments, it is not necessary for the system to be provided with any information regarding the locations of each of the sensors. The sensor identifiers and sequence in which those sensors detect and notify the system of motion detection events may be sufficient for the system to identify the known paths.

Figure 2B:
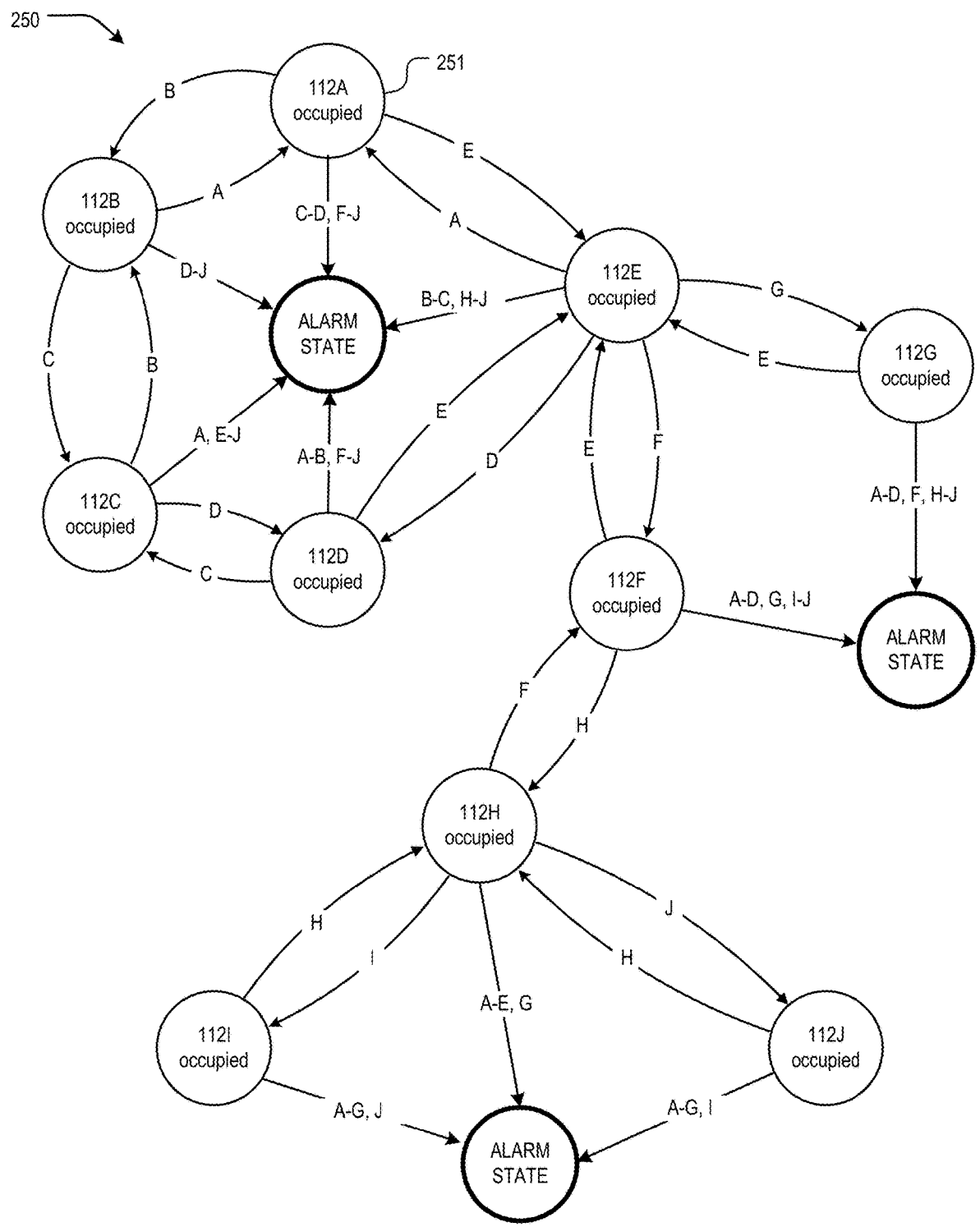
FIG. 2B depicts a state diagram for a security system, in accordance with embodiments of the present invention.

FIG. 2B depicts an example state diagram 250 representing a state machine for detecting known paths, in accordance with embodiments of the present invention. Node 251 represents the state in which sensor 110A has detected the presence of an occupant in master bedroom 112A. If the occupant travels along path 114a, as illustrated in FIG. 1, the occupant will vacate the coverage area of sensor 110A and subsequently enter the coverage area of sensor 110E. When movement is next detected by sensor 110E, the state follows transition E to the state "112E occupied," which represents a previously-stored known path of travel. As the occupant walks along path 114a to the family room 112F, the movement is detected by sensor 110F and the state follows transition F to the state "112F occupied," which represents a continuation along a valid path of travel. Next, as the occupant travels through the coverage area of sensor 110H to the coverage area of sensor 110I, the state follows transition H to "112H occupied" and then transition I to "112I occupied." These series of transitions correspond to a known valid path, so the system does not transition to an alarm state. However, if the occupant vacates the coverage area of sensor 110H and then motion is next detected at any of sensors 110A, 110B, 110C, 110D, 110E, or 110G, this represents an unknown or invalid path, so the transition "A-E, G" leads to an output condition of an alarm state.

Figure 3:
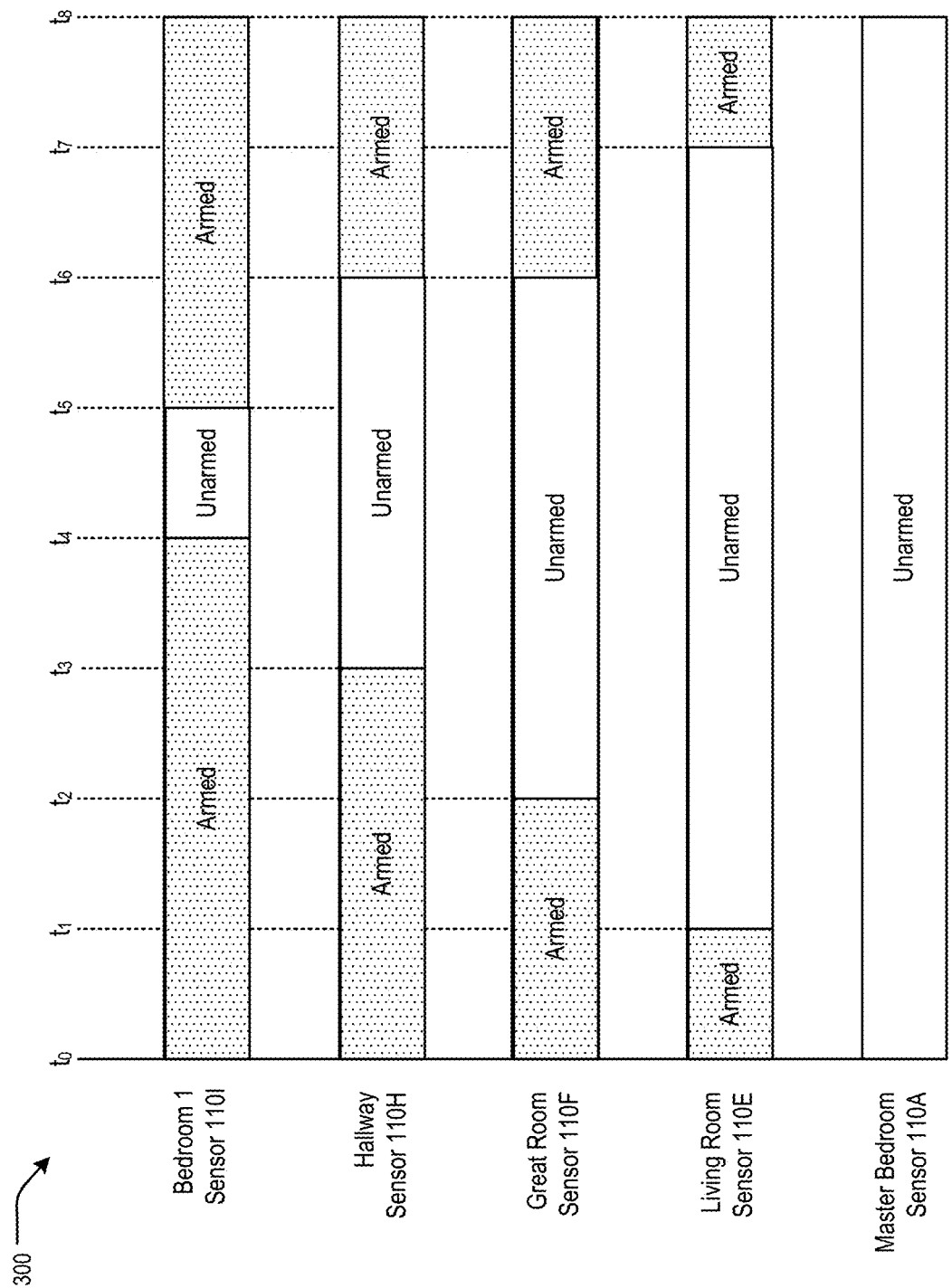
FIG. 3 is a timing chart illustrating a method of operating a security system, in accordance with embodiments of the present invention.

Other methods of monitoring the paths of travel are also possible. FIG. 3 is a timing chart 300 illustrating a method of operating a security system for an occupant travelling along a known valid path 114a-114b, in accordance with other embodiments of the present invention. The flow begins at time t0, at which point an authorized occupant is located in the coverage area of the master bedroom sensor 110A. In this case, the sensor 110A can be placed in an unarmed state in which any motion detection by sensor 110A will not result in the security system 100 transitioning to an alarm state. Sensor 110A may remain operational and will continue to detect movement, but the detected movement will not result in an alarm state. The other sensors 110E, 110F, 110H, 110I remain in an armed state.

At time t1, motion is detected by the living room sensor 110E. Because the path of travel from sensor 110A to sensor 110E is a known valid path, the sensor 110E will change to an unarmed state. As the occupant continues to travel along known known path 114a through sensors 110F, 110H, and 110I, at times t2, t3, and t4, respectively, those sensors 110F, 110H, and 110I are put into an unarmed state. In some embodiments, each of these unarmed sensors remain in the unarmed state until the occupant returns along return path 114b through sensors 110H, 110F, 110E, and 110A, at times t5, t6, and t7, respectively, with each sensor returning to an armed state after the occupant has been detected and then vacated the coverage area. This may be desirable in order to avoid false alarms caused when two people are travelling together along the same path, but one of the two people remains behind in one of the rooms while the other continues along the known path. In some embodiments, the system may have a timeout threshold, after which the unarmed sensors would return to the armed state after no movement is detected by that sensor for a predetermined period of time (e.g., ten minutes, 1 hour, etc.).

Figure 4:
FIG. 4 is an example data matrix for use in a security system, in accordance with embodiments of the present invention.

FIG. 4 is an example matrix 400 illustrating another method of tracking known paths, in accordance with embodiments of the present invention. This matrix 400 represents the outcome of any transitions from one sensor to another within the building 101. The rows represent the sensor initially detecting the presence of an occupant (e.g., sensors 110A-110J), and the columns represent the immediately subsequent sensor detecting the presence of an occupant after the occupant vacates its initial location. The cell at the intersection of the row and column contains the outcome—valid ("1") or invalid ("0"). For example, if motion is first detected by sensor 110A (row A), and the next motion is detected by sensor 110B (column B), the outcome is "1", which represents a known path. Therefore, the system would not transition to the alarm state. However, if motion is first detected by sensor 110C (row C), and the next motion is detected by sensor 110A (column A), the outcome is "0", which represents an invalid path. Referring to FIG. 1, it can be seen that it would not be possible for an occupant to travel directly from the office 112C to the master bedroom 112A without first traveling through the closet 112B (where they would be detected by sensor 110B) or through the foyer 112D (where they would be detected by sensor 110D) and living room 112E (where they would be detected by sensor 110E), before entering the bedroom 112A. As a result, the path from C to A is an invalid one, which would cause the system to transition to an alarm state.

In some embodiments, the system 100 may maintain information regarding the locations of the various occupants in the building 101, which can be used to maintain the occupancy state of each sensor's coverage area. In one example, when a user arms the system 100 to home mode, a control panel or application on the user's mobile device would prompt the user to confirm the currently known locations of the occupants of the house. These locations would be stored and can be used as the starting point in tracking their paths of travel through the building 101. For example, a guest may be sleeping at the office 112C at the time at which the user activates the home mode. Because the guest is sleeping, the sensor 110C in the office 112C may not detect any movement and therefore would not know that the office 112C was in fact occupied. As a result, if the guest got up in the middle of the night to get a glass of water from the kitchen, the sensor 110C may detected unexpected movement in the office 112C and therefore cause the system to transition to the alarm state. To avoid this, the user, when engaging home mode, may notify the system 100 that the office 112C is occupied. In other examples, the system 100 could record the last known location of the occupants reviewing all motion previously detected over a predefined interval of time (e.g., one hour) prior to the activating of home mode. This way the system would not transition to the alarm state when the occupant merely wakes up in the night.

In various examples described herein, the known paths may be defined by a sequence of sensor event detections. In other embodiments, other factors, such as time, may be utilized in defining the known paths. For example, there may be different sets of known paths based on the time of day. A known path may be defined as a sequence of sensor event detections on a particular day of the month, day of the week, time of day, time range, or other time frame indicating a permissible period of time for motion to be detected along the known path. For example, certain paths may only be travelled during the day (e.g., from 7 AM to 10 PM), so those paths would only be treated as known paths during that window of time between 7 AM and 10 PM. If motion is detected along that path at night between 10 PM and 7 AM, that motion may cause the system to transition to an alarm state.

In yet other embodiments, the known paths may be defined by the timing and sequence of sensor event detections. In the example described above, if an occupant travels along known path 114a through the hallway 112H, the system would not transition to an alarm state. However, the known path may include timing thresholds for successive motion detection events. For example, it would be very unusual for a person to remain in the hallway 112H for an extended period of time. Therefore, if movement is detected from the family room 112F to the hallway 11H, but an extended period of time elapses (e.g., greater than a predetermined threshold time) before movement is detected in any of the adjoining rooms 112F, 112I, or 112J, an event detection timeout condition would be met and the travel along that path would no longer be considered as a known path. In the state machine example described above, if an event detection timeout condition is met without detecting another event, the state machine may be reset. In some embodiments, the length of the timeout period may be a function of how frequently movement at the sensor and/or along that path is detected. As a result, rooms that are frequently occupied may permit a longer timeout period before resetting the state machine.

As described above, the security system 100 may begin with a learning phase in which the control system 130 monitors and records all of the movement detected by the interior sensors 110A-110J to generate the known path database 131. After the learning phase is completed, the active phase may begin. Different factors may be used in determining when the learning phase is completed, in accordance with various embodiments. In one simple example, the learning phase may proceed for a set period of time (e.g., six months), at which point the active phase begins. In other examples, the predetermined period of time may be a function of the number of sensors in the house, the number of rooms in the house, the number of occupants of the house, and/or the square footage of the location being monitored. In yet other embodiments, the system 100 may remain in the learning phase until no new paths of travel are detected for a predetermined period of time (e.g., one month or several months). It may be assumed that if the household members move about the house for one month without any previously observed known paths of travel being detected, then all or nearly all of the possible valid paths of travel have been detected and stored. In some embodiments, after the active mode has been engaged, the number or frequency of false alarms may cause the system 100 to switch back to learning mode. For example, the system 100 may repeatedly detect invalid paths and transition to the alarm state, but is informed by the user that the paths were valid. If this occurs too many times or too frequently, the system 100 may return to the learning phase so as to reduce the inconvenience and annoyance of the false alarms.

Figure 5:
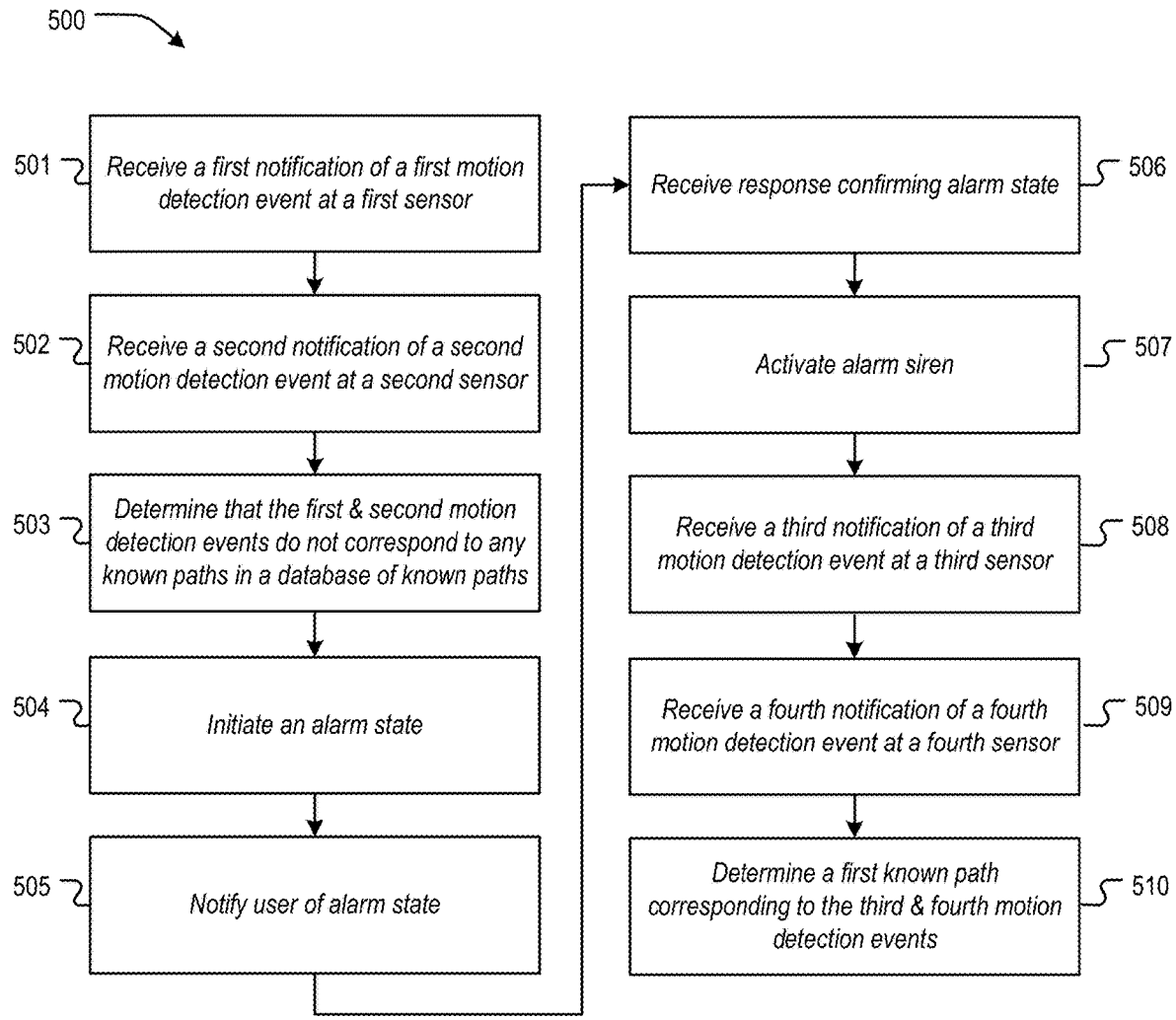
FIG. 5 is a flowchart illustrating a method of operating a security system, in accordance with embodiments of the present invention.

FIG. 5 is a flowchart 500 illustrating a method of operating a security system, in accordance with embodiments of the present invention. In step 501, the system receives a first notification of a first motion detection event at a first sensor at a first time, the first sensor having a first identifier. In step 502, the system receives a second notification of a second motion detection event at a second sensor at a second time after the first time, the second sensor having a second identifier. In step 503, the system determines that the first and second motion detection events do not correspond to any known paths in a database of known paths. In step 504, the system initiates an alarm state. In step 505, the system sends a message to the user to notify the user of the alarm state and may request confirmation that an alarm should be sounded and the authorities alerted. In step 506, the system receives a response from the user confirming the alarm state. In step 507, the system may activate an alarm siren or generate other notifications to the police, security service, or other identified individuals or organizations.

In other situations, the system may detect motion along a known path, and therefore not initiate the alarm state. For example, in step 508, the system may receive a third notification of a third motion detection event at a third sensor at a third time, the third sensor having a third identifier. In step 509, the system may receive a fourth notification of a fourth motion detection event at a fourth sensor at a fourth time after the third time, the fourth sensor having a fourth identifier. In step 510, the system may determine a first known path in the database of known paths, wherein data for the first known path comprises a first series of identifiers including the third identifier followed by the fourth identifier.

The security system 100 may be implemented using any suitable combination of computing devices and technologies. In some embodiments, one or more components or functions of the control system 130 and/or security system 100 may be performed by a computer server at a different location, e.g., via a cloud-based service. However, because the security system 100 may be used to record the movement of people through a user's private residence, that user may prefer that this data be stored locally on a computing device under the physical control of the user. For example, a dedicated computing device located in the building 101 may implement one or more components or functions of the control system 130. In other embodiments, a general-purpose computer server programmed to perform a variety of functions in addition to those associated with the security system 100 may be used.

In yet other embodiments, a computer server implemented as an edge computing system may be used as the control system 130, in addition to performing additional services for other devices on the local area network (LAN), while providing enhanced security features. As used herein, "edge device" may refer to a computing device providing access to back-end systems (such as back-end enterprise servers) associated with various devices on the LAN. Various devices may be communicatively coupled to the edge device over a wired LAN or wireless local area network (e.g., WLAN 650). Edge devices may provide computation capability and/or storage capability at a location that is physically proximate to where such computation and/or storage is needed. For example, a base station that communicates with a smart camera on a WLAN 650 and provides one or more computer vision techniques for video data captured by the camera may be an example of an "edge" device. In various examples, edge devices may provide access to one or more back-end services associated with the edge device. The ability to perform various services locally as opposed to remotely by back-end services, may offer reduced latency. Additionally, the edge computing system described herein may offer increased computing capability relative to one or more hardware-constrained smart devices that communicate with the edge computing system. Accordingly, various computing operations may be "off-loaded" from the smart device to an edge computing system that is local to the smart device. "Local," as used herein, may refer to devices that may communicate with one another over a LAN and/or via direct peer-to-peer communication, as opposed to over a wide area network (such as the internet).

As used herein, "system" refers to hardware and software components upon which other applications (e.g., third party smart device applications and/or other software) may be deployed and executed. As used herein, applications refer to software that may be executed to perform various services. A single application may comprise multiple operations and/or processes. In various examples, different components of the edge computing system described herein may perform different operations and/or processes of an application. For example, as described in further detail below, an application may be deployed by an edge computing system across multiple guest virtual machines, with each guest virtual machine deploying one or more processes and/or operations of the application.

Figure 6:
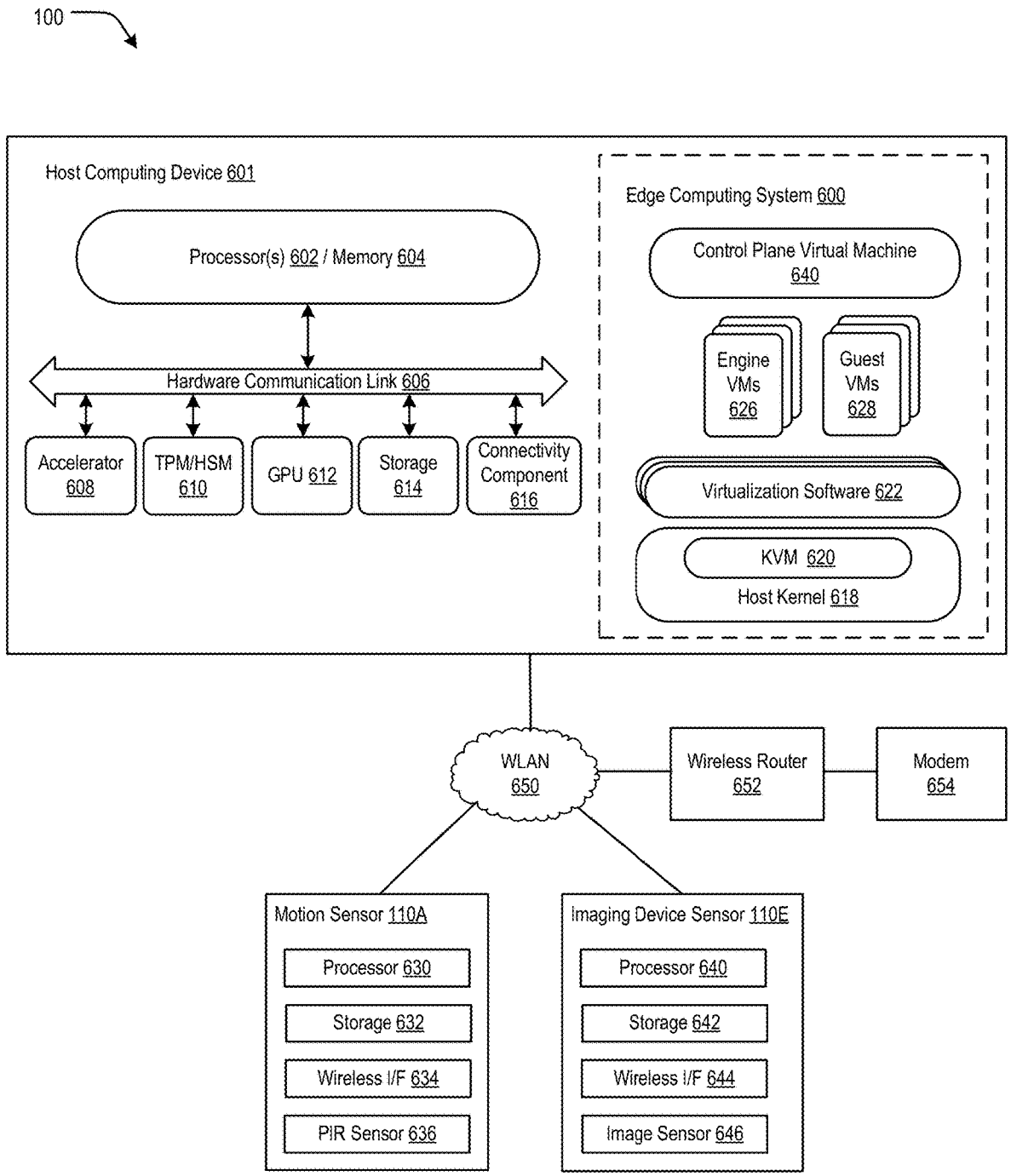
FIG. 6 is a block diagram showing an example security system and architecture of a computing device that may be used in accordance with various embodiments described herein.

In various examples, the edge computing systems described herein may be executed by a hub or base station computing device (e.g., a host computing device 601, as shown in FIG. 6) that may be configured in communication with one or more computing devices. For example, the edge computing system may comprise an operating system executing at least in part on a base station computing device communicating on WLAN 650 within a user's home.

Further, the edge computing system may be designed in such a way as to emphasize security and privacy of data within the software stack of the edge computing system. For example, the edge computing system may control access to application-specific data and may provide security measures effective to prevent unauthorized access to data. Additionally, the edge computing system may control access to underlying host resources of the physical computing device(s) upon which the edge computing system executes. Further, the edge computing system may control and/or limit communication of data between different applications installed and/or executing on the edge computing system.

FIG. 6 is a block diagram depicting an example security system 100, edge computing system 600, and a host computing device 601 executing edge computing system 600, according to various embodiments of the present disclosure. Various components of FIG. 6 may be omitted in various implementations of the edge computing systems described herein. Further, additional components apart from what is depicted in FIG. 6 may be added, depending on the desired implementation.

Edge computing system 600 may be executed by one or more physical machines (e.g., one or more computing devices). For example, edge computing system 600 may be executed by host computing device 601. The host computing device(s) 601 may comprise one or more processors 602 (e.g., one or more single-core and/or multi-core processors). The one or more processors 602 may be configured in communication with memory 604 (e.g., random access memory). In various examples, memory 604 may be effective to store various instructions selected from a native instruction set of the edge computing system. The instructions may be used to program the one or more processors 602 to perform various processes and/or to instantiate the various components of the edge computing system 600 described in further detail below. Further, the one or more processors 602 may be effective to retrieve data stored in a storage 614.

The one or more processors 602 may comprise any suitable processors. For example, the one or more processors 602 may comprise one or more digital signal processors (DSPs), general purpose processor cores, and/or graphical processing units. Similarly, storage 614 and memory 604 may include one or more different types of memory, data storage, or computer-readable storage media devoted to different purposes within the edge computing system 600.

The one or more processors 602 may communicate with various other hardware components of the host computing device 601 via communication link 606. Communication link 606 may include one or more communication links (e.g., one or more buses) that may transmit data between various hardware components of the host computing device 601 executing edge computing system 600. Data may be sent serially or in parallel depending on the particular implementation. Additionally, the communication link 606 may be classified into a certain number of bits (e.g., 16-bit, 32-bit, 64-bit, etc.) that describes the number of bits that the communication link 606 is able to transmit in parallel. The bit classification of a particular communication link 606 may depend on the design of the particular bus (and/or on the design of one or more of the processors 602 communicatively coupled to the bus). In various examples, the communication link 606 may be used to transfer data, may include address lines for accessing particular memory addresses (e.g., in storage 614), may supply power to various hardware components, and/or may provide a system clock that may be used to synchronize various signal and components communicating via the communication link 606.

In various examples, the host computing device 601 may comprise various hardware components that may be communicatively coupled to the one or more processors 602 and/or the memory 604 via the communication link 606. For example, the host computing device 601 may include an accelerator 608, a trusted platform module (TPM), and/or a hardware security module (HSM) 610 (subsequently referred to as TPM/HSM 610), an artificial intelligence (AI) accelerator application specific integrated circuit (ASIC) used for machine learning, a graphics processing unit (GPU) 612, storage 614, and/or connectivity component 616.

Accelerator 608 may be a hardware acceleration component (e.g., a hardware accelerator circuit) effective to perform one or more operations that may improve the speed and/or performance of functionality of the computing system relative to executing the same operations in software on a general purpose processor. In various examples, the accelerator 608 may comprise one or more ASICs, programmable circuits (e.g., field-programmable gate arrays (FPGAs)), and the like. The accelerator 608 may perform operations effective to increase the processing speed, reduce power consumption, lower latency, increase parallelism, improve utilization of various other components, etc. In general, accelerator 608 may include circuits that may be used to perform any processing task that may be performed by a general purpose processor. However, the use of a dedicated accelerator 608 may improve performance of that processing task by off-loading the processing task from the general purpose processor to the special purpose hardware of the accelerator 608. Since the accelerator 608 is designed and/or programmed to perform one or more specific tasks, use of accelerator 608 may achieve performance efficiencies relative to the use of the general purpose processor (e.g., one or more processors 602) for the same task.

Various examples of accelerators 608 may include a network processor, and/or network interface controller (e.g., an NPU and/or NIC), a digital signal processor (DSP), an analog signal processor, a cryptographic accelerator to perform hardware-based encryption, a codec accelerator, a physics processing unit, an image/video decoder circuit, an image/video encoder circuit, a data compression accelerator, etc. In various examples, a TPM, an HSM 610, an AI accelerator, and/or GPU 612 may be dedicated hardware accelerators that may be described as part of accelerators 608. However, the TPM, HSM 610, AI accelerator, and/or GPU 612 may be described as separate components herein for conceptual clarity due to various implementations of host computing device 601 making use of such components. However, in various examples, a TPM, an HSM 610, an AI accelerator, and/or a GPU 612 may be considered as a subset of accelerator 608 and/or as a subset of hardware acceleration components. HSM 610 may be a hardware component of host computing device 601 that may store cryptographic keys used for encryption of data. In various examples, TPMs and/or HSMs may be used to protect data in storage 614 by making the data inaccessible until a system verification and/or authentication process is completed. TPMs may be hardware-based components which include a key that may be used for asymmetric encryption. TPMs can generate, store, and protect other keys used during encryption/decryption processes. An HSM is a security component that may be added to encrypted computing systems to manage, generate, and securely store cryptographic keys. HSMs may be instantiated as a dedicated hardware component (e.g., as a removable hardware component such as a PCI card) and/or may be an external device accessible via a network using transmission control protocol/internet protocol (TCP/IP).

AI accelerator and/or graphical processing unit (GPU) 612 may be dedicated hardware accelerators used for specialized processing tasks. Generally, GPUs are electronic circuits designed to manipulate and alter memory to accelerate the creation of image data in a frame buffer. The GPU may be embedded on the motherboard and/or may be present on a video card (e.g., a PCI card). GPUs may be used to perform parallel calculations related to three-dimensional (3D) graphics. Additionally, GPUs may be used to accelerate memory-intensive graphical processing operations such as texture mapping, polygon rendering, geometric calculations (e.g., rotation, translation, sheer, etc. of vertices of 3D representations into different coordinate systems). Other capabilities of GPUs may include texture manipulation, interpolation, anti-aliasing, high precision color mapping, discrete cosine transforms (DCT) and other frequency-based transforms, computer vision, motion compensation, intra-frame prediction, quantization, inter-encoding, etc.

In various examples, an AI accelerator circuit may be configured in communication with other hardware components via communication link 606. The AI accelerator circuit may be effective to perform operations on tensors (e.g., matrix multiplication), and may comprise ASICs and/or programmable circuits configured to perform a large volume of low precision computation, as compared to GPUs. In other embodiments, other tensor-processing circuits may be used in accordance with the host computing device 601. Tensor processing may be used to accelerate neural network and/or other machine learning computations. Additionally, implementing tensor processing in an ASIC may enable the decreased consumption of energy relative to a functionally equivalent programmable circuit (e.g., a GPU). Generally, dedicated tensor processing circuits are designed to perform matrix multiplication, summation, and activation function processing. Matrix multiplication is often computationally-intensive. Accordingly, a dedicated tensor processing unit may enable the edge computing system 600 executing on host computing device 601 to perform various machine learning tasks locally instead of sending such tasks to a remote cloud-based server. Local execution may reduce latency and thus provide an improved user experience and improved local-processing capability.

Storage 614 may comprise one or more disk drives of non-volatile storage. Storage 614 may comprise a disk drive, solid state drive, flash memory, and/or any other type of non-volatile storage medium. The one or more processors 602 may communicate with storage 614 via communication link 606. For example, the one or more processors 602 may load data from storage 614 into memory 604.

Connectivity component 616 may comprise a network interface card (NIC) effective to connect to the computing device 601 to a network. Generally, connectivity component 616 may implement the physical layer and the data link layer of the Open Systems Interconnection model (OSI model). The connectivity component 616 may allow the computing device to access the WLAN 650 provided by a router 652. The router 652, in turn, may be connected to a modem 654 providing access to the internet. Accordingly, the connectivity component 616 may provide for communication with other devices on the LAN as well as with remote computing devices accessible via the internet. The router 652 and modem 654 may act as the access point for internet communication. As used herein, LAN may refer to both wired and wireless local area networks. Additionally, connectivity component 616 of host computing device 601 may comprise both wireless and wired communication technologies. For example, connectivity component 616 may include wireless NICs effective to wirelessly communicate data with one or more other devices via a WLAN 650 using the IEEE 802.11 standard.

The various hardware components (e.g., one or more processors 602, memory 604, communication link 606, accelerator 608, TPM/HSM 610, TPU/GPU 612, storage 614, connectivity component 616, etc.) may be part of a host computing device 601 that, in turn, may be a part of edge computing system 600. Although referred to as a computing device, host computing device 601 may comprise multiple different computing devices that may be included in one or more physical hardware groupings or "boxes."

In various examples, memory 604 may be physically dispersed between various chip sets and/or hardware components of host computing device 601. For example, a first portion of memory 604 may be deployed on a motherboard along with the one or more processors 602. Additionally, in some examples, one or more on-board GPUs may be deployed on the motherboard. In addition, a second portion of memory 604 may be deployed on-board with respect to other hardware components, such as TPU/GPU 612. Additionally, in some examples, connectivity component 616 may comprise a platform controller hub (PCH) and/or a peripheral component interconnect (PCI) bus.

Upon booting, host computing device 601 executes its operating system. Any desired operating system may be used in accordance with the various embodiments described herein. In various examples, in a virtualized environment such as that described herein, host computing device 601 may be referred to as the "host" device, which "hosts" one or more virtualized computing environments, as described in further detail below.

The host operating system may comprise a host kernel 618. The host kernel 618 is a computer program that controls the host operating system and access to system resources. The host kernel 618 is typically loaded after the bootloader during start-up of the host computing device 601. The host kernel 618 performs start-up operations, handles input-output requests from software, and translates the input/output requests into instructions executable by the one or more processors 602. Additionally, the host kernel 618 controls memory 604, storage 614, and peripheral devices. The code of the host kernel 618 is typically loaded into a protected kernel space in memory 604 that is protected from access by application programs and/or from other non-critical components of the host operating system. The host kernel 618 controls access to the one or more processors 602 (e.g., thread scheduling, etc.), manages hardware devices (such as memory 604, communication link 606, decode accelerator 608, TPM/HSM 610, TPU/GPU 612, storage 614, connectivity component 616, etc.), and handles interrupts in the protected kernel space within memory 604.

The host kernel 618 may have access to the memory 604 and may control access by various processes executing on the one or more processors 602 to memory 604. In various examples, the host kernel 618 controls access to memory 604 using virtual addressing. Virtual addressing refers to making a physical memory address appear to be another address called the "virtual address." Virtual address spaces allow different programs to access memory 604 as if no other programs apart from that program were currently executing, preventing applications from crashing one another.

On many systems, a program's virtual address may refer to data which is not currently in memory. The layer of indirection provided by virtual addressing may enable the host operating system to use other non-volatile data stores, such as storage 614, to store what would otherwise be stored in a volatile memory 604 (e.g., RAM). As a result, the host operating system can allow programs to use more memory 604 than the system has physically available. When a program needs data which is not currently in memory 604, the processor(s) 602 signals to the host kernel 618 that a request for such missing data has been received, and the host kernel 618 may respond by writing the contents of an inactive memory block of memory 604 to storage 614 (if necessary) and replacing the inactive memory block with the data requested by the program. The program can then be resumed from the point where it was interrupted.

Virtual addressing may also enable creation of virtual partitions of memory in two disjointed areas, one being reserved for the host kernel 618 (e.g., the "kernel space") and the other for the applications (e.g., the "user space"). The applications are not permitted by the processor(s) 602 to address the kernel space memory, thus preventing an application from damaging the running kernel.

Additionally, the host kernel 618 provides access to peripherals and other hardware through device drivers. A device driver is a computer program that enables the operating system to interact with a hardware device. It provides the operating system with information on how to control and communicate with a certain hardware component. The driver translates operating system-mandated function calls (sometimes referred to as "programming calls") into device-specific calls effective to control the hardware.

A process may execute a system call to request a service from the operating system's host kernel 618 that the process normally does not have permission to run. System calls provide the interface between a process (e.g., an application) and the host kernel 618. Most operations interacting with the system require permissions not available to a user level process. For example, input/output for a hardware component present on the system and/or communication with other executing processes requires the use of system calls.

A system call is a mechanism that is used by the application program to request a service from the operating system. System calls employ a machine-code instruction that causes the processor(s) 602 to change modes. An example would be from supervisor mode to protected mode where the operating system performs actions like accessing hardware devices or a memory management unit. Generally the operating system provides a library for interfacing between the operating system and normal programs (e.g., a C library such as GNU C (glibc package) or Windows API). The library handles the low-level details of passing information to the host kernel 618 and switching to supervisor mode. System calls include close, open, read, wait and write. During execution, a process accesses various services provided by the host kernel 618. The library is used to invoke the various host kernel 618 functions.

In various examples, a virtualization module may be executed on the host kernel 618 to allow the host kernel 618 to function as a hypervisor. A hypervisor may be software, hardware, and/or some combination of hardware and software that may generate and execute virtual machines (e.g., a guest computing environment hosted by one or more physical machines). Typically, hypervisors are divided into "Type 1" hypervisors or "bare-metal" hypervisors and "Type 2" or "hosted" hypervisors. Type 1 hypervisors run directly on the host device's hardware while Type 2 hypervisors run as a program on an operating system of the host.

Generally, control plane virtual machine 640 implements a portion of the operating system of edge computing system 600 that controls generation of new virtual machines (e.g., creation of new guest virtual machines 628) and start/stop of existing virtual machines (e.g., guest virtual machines 628, engine virtual machines 626, and/or primitives). Once a guest virtual machine 628 is started and is running, control plane virtual machine 640 is not involved with the flow of data between the guest virtual machine 628 and the corresponding device (e.g., a smart device on the LAN) or back-end service. Instead, the code, applications, and/or devices executed by the guest virtual machines 628 may implement network communication with back-end services and perform guest-specific processing according to their specific configurations.

In FIG. 6, a Kernel-based Virtual Machine (KVM) 620 is executed by host kernel 618. KVM is a virtualization module of the Linux kernel. KVM uses hardware support in the form of a processor with hardware virtualization extensions such as Intel VT or AMD-V. KVM 620 is loaded into memory 604 and utilizes the processor(s) 602 and a user-mode driver QEMU (and/or other hardware emulation system) to emulate a hardware layer upon which virtual machines can be created and executed. One or more of guest virtual machines 628 may be KVM guests generated by KVM 620.

In general, different virtualization software 622 may be executed by host kernel 618. Accordingly, guest virtual machines 628 may be launched using a variety of different virtualization software depending on the particular hardware emulation requirements of a given guest virtual machine. Generally, guest virtual machines may run unmodified operating systems and may include private virtualized hardware (e.g., a network card, memory, disk, GPU, etc.).

Guest virtual machines 628 are isolated from one another allowing multiple guest VMs 628 to run securely while sharing the same physical hardware. Guest virtual machines may be isolated as the resources of the host machine (e.g., processor(s) 602, memory 604, storage 614, etc.) are controlled and limited by KVM 620.

The virtualization software 622 (e.g., a hypervisor/virtual machine manager) may be used to deploy guest virtual machines 628. In various examples, guest virtual machines 628 may be used to execute applications and/or services corresponding to particular devices configured to communicate with the edge computing system 600 executing on host computing device 601. For example, the devices may include the various sensors described above, as well as smart devices, such as a smart camera, a smart thermostat, and a smart lighting system. Each of these smart devices may each be associated with their own guest virtual machine 628 on edge computing system 600 to perform various tasks related to the device. Accordingly, components of the edge computing system 600 may execute as virtual machines on virtualization software 622. The user space of host kernel 618 may be minimal with the majority of operating system functionality being implemented by a control plane virtual machine 640.

A sensor engine virtual machine may be an engine virtual machine 626 effective to receive data from hardware sensors communicatively coupled with host computing device 601 executing edge computing system 600, such as the sensors 110C-110F and 120A-120D, temperature sensors, humidity sensors, leak sensors, proximity sensors, etc. For example, the hardware sensors may send MATT messages that may be received by the sensor engine virtual machine. The sensor engine virtual machine may buffer the sensor data and/or the sensor data may be sent to a payload service which may buffer the sensor data in virtual memory locations shared by one or more subscribing applications. In addition, the sensor engine virtual machine may send notifications to other applications (e.g., guest virtual machines 628) when sensor data is received that pertains to the guest applications. One skilled in the art will appreciate that the various engine virtual machines explained above are for illustrative purposes only. Various other types of engine virtual machines can be deployed based on the uses cases and configuration of the edge computing system 600.

In accordance with embodiments of the present invention, the control system 130 may be executed on a guest virtual machine 628 of an edge computing system 600. This may enable the control system 130 to have access to other sensors and devices coupled to the edge computing system 600 that are not dedicated components of the security system. These other sensors and devices may provide information regarding movement or occupancy detection that can be utilized in generating the known path database 131 and monitoring for unauthorized movement in the house.

The host computing device 601 may be in wireless communication with one or more sensors, e.g., motion sensor 110A and imaging device sensor 110E, over a WLAN 650. The motion sensor 110A may comprise one or more processors 630, a storage 632 storing instructions for programming the one or more processors 630 to perform various functionality of the motion sensor 110A, a connectivity component (e.g., wireless communications interface 634) for communicating with the host computing device 601 over the WLAN 650, and a PIR sensor 636. The imaging device sensor 110E may comprise one or more processors 602, a storage 642 storing instructions for programming the one or more processors 602 to perform various functionality of the imaging device sensor 110E, a connectivity component (e.g., wireless communications interface 644) for communicating with the host computing device 601 over the WLAN 650, and an image sensor 646.

Although various systems described herein may be embodied in software or code executed by general purpose hardware as discussed above, as an alternate the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A security monitoring method, comprising:
receiving a first notification of a first motion detection event at a first sensor at a first time, the first sensor having a first identifier;
receiving a second notification of a second motion detection event at a second sensor at a second time after the first time, the second sensor having a second identifier;
determining that the first and second motion detection events do not correspond to any known paths in a database of known paths;
initiating an alarm;
receiving an input to silence the alarm; and
storing data about a new path in the database of known paths, wherein data for the new path comprises the first and the second identifier arranged in a sequence.

2. The method of claim 1, wherein:
the database of known paths includes data associated with a plurality of known paths, and wherein data for each known path of the plurality of known paths includes a corresponding plurality of motion sensor identifiers arranged in a specific sequence.

3. The method of claim 1, further comprising:
receiving a third notification of a third motion detection event at a third sensor at a third time, the third sensor having a third identifier;
receiving a fourth notification of a fourth motion detection event at a fourth sensor at a fourth time after the third time, the fourth sensor having a fourth identifier; and
determining a first known path in the database of known paths, wherein data for the first known path comprises a first series of identifiers including the third identifier followed by the fourth identifier.

4. The method of claim 1, further comprising:
storing data about a first known path in the database of known paths, wherein data about the first known path comprises a first series of sensor identifiers including the first identifier and the second identifier, and a time frame indicating a permissible period of time for the first known path;
receiving a third notification of a third motion detection event at the first sensor at a third time;
receiving a fourth notification of a fourth motion detection event at the second sensor at a fourth time;
determining that the third time and the fourth time are outside of the time frame; and
initiating the alarm.

5. The method of claim 1, further comprising:
storing data about a first known path in the database of known paths, wherein data about the first known path comprises a first series of sensor identifiers including the first identifier and the second identifier, and a timeout threshold indicating a permissible period of time between successive motion detection events;
receiving a third notification of a third motion detection event at the first sensor;
receiving a fourth notification of a fourth motion detection event at the second sensor after a period of time greater than the timeout threshold has elapsed since the third motion detection event; and
initiating the alarm.

6. The method of claim 1, wherein:

the database of known paths comprises a matrix having a first dimension representing identifiers for an initial motion detection event and a second dimension representing identifiers for a subsequent motion detection event, wherein data at an intersection of the initial motion detection event in the first dimension and the subsequent motion detection event in the second dimension indicates whether the initial motion detection event followed by the subsequent motion detection event corresponds to a known path.

7. A security monitoring method, comprising:

receiving a first notification of a first motion detection event at a first sensor at a first time, the first sensor having a first identifier;

receiving a second notification of a second motion detection event at a second sensor at a second time after the first time, the second sensor having a second identifier;

determining that the first and second motion detection events do not correspond to any known paths in a database of known paths;

initiating an alarm;

determining a state machine comprising a plurality of states and a plurality of transitions, wherein each state is associated with a corresponding identifier; and determining a first transition of the plurality of transitions indicating change from a first state associated with the first identifier to a second state associated with the second identifier.

8. The method of claim 7, further comprising:

receiving an input to terminate the alarm;

causing display of a user interface element requesting whether the first and second motion detection events are to be added as a new known path;

receiving a response via the user interface element; and storing, based on the response, the first and second identifiers in a sequence as a new known path in the database of known paths.

9. The method of claim 7, further comprising:

after the first transition to the second state, determining a second transition of the plurality of transitions indicating a subsequent motion detection event at a third sensor, wherein the second transition leads to an output condition corresponding to an alarm state.

10. The method of claim 7, further comprising:

determining that no notifications of motion detection events are received within a predetermined period of time after receiving the second notification of the second motion detection event; and resetting the state machine.

11. A security monitoring method, comprising:

determining a plurality of known paths, the determining comprising, for each of the plurality of known paths:

receiving data about a corresponding series of motion detection events, each motion detection event being from a corresponding one of a plurality of sensors; and storing data about the series of motion detection events as a corresponding one of the plurality of known paths;

receiving a first notification of a first motion detection event at a first sensor of the plurality of sensors at a first time, the first sensor having a first identifier;

receiving a second notification of a second motion detection event at a second sensor of the plurality of sensors at a second time after the first time, the second sensor having a second identifier;

determining that the first and second motion detection events do not correspond to any known paths in the plurality of known paths;

initiating an alarm;

receiving an input to terminate the alarm;

causing display of a user interface element requesting whether the first and second motion detection events are to be added as a new known path;

receiving a response via the user interface element; and storing, based on the response, the first and second identifiers in a sequence as a new known path.

12. The method of claim 11, wherein:

data associated with the plurality of known paths includes, for each known path, a plurality of motion sensor identifiers arranged in a specific sequence.

13. The method of claim 11, further comprising:

receiving a third notification of a third motion detection event at a third sensor at a third time, the third sensor having a third identifier;

receiving a fourth notification of a fourth motion detection event at a fourth sensor at a fourth time after the third time, the fourth sensor having a fourth identifier; and determining a first known path, wherein data for the first known path comprises a first series of identifiers including the third identifier followed by the fourth identifier.

14. A security monitoring method, comprising:

determining a plurality of known paths, the determining comprising, for each of the plurality of known paths:

receiving data about a corresponding series of motion detection events, each motion detection event being from a corresponding one of a plurality of sensors; and storing data about the series of motion detection events as a corresponding one of the plurality of known paths;

receiving a first notification of a first motion detection event at a first sensor of the plurality of sensors at a first time, the first sensor having a first identifier;

receiving a second notification of a second motion detection event at a second sensor of the plurality of sensors at a second time after the first time, the second sensor having a second identifier;

determining that the first and second motion detection events do not correspond to any known paths in the plurality of known paths;

initiating an alarm;

determining a state machine comprising a plurality of states and a plurality of transitions, wherein each state is associated with a corresponding identifier; and determining a first transition of the plurality of transitions indicating change from a first state associated with the first sensor to a second state associated with the second identifier.

15. The method of claim 11, further comprising:

storing data about a first known path comprising a first series of sensor identifiers including the first identifier and the second identifier, and a time frame indicating a permissible period of time for the first known path;

receiving a third notification of a third motion detection event at the first sensor at a third time;

receiving a fourth notification of a fourth motion detection event at the second sensor at a fourth time;

determining that the third time and the fourth time are outside of the time frame; and initiating the alarm.

16. The method of claim 1, further comprising:
determining a state machine comprising a plurality of states and a plurality of transitions, wherein each state is associated with a corresponding identifier; and
determining a first transition of the plurality of transitions indicating change from a first state associated with the first identifier to a second state associated with the second identifier.

* * * * *